United States Patent
Liang et al.

(10) Patent No.: US 12,416,747 B2
(45) Date of Patent: Sep. 16, 2025

(54) SPOOF SURFACE PLASMON POLARITON TRANSMISSION LINE STRUCTURE, CIRCUIT BOARD, AND ELECTRONIC DEVICE

(71) Applicant: HUAWEI TECHNOLOGIES CO., LTD., Shenzhen (CN)

(72) Inventors: Yuan Liang, Chengdu (CN); Dongyu Geng, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 402 days.

(21) Appl. No.: 18/175,086

(22) Filed: Feb. 27, 2023

(65) Prior Publication Data

US 2023/0221472 A1      Jul. 13, 2023

Related U.S. Application Data

(63) Continuation of application No. PCT/CN2021/112217, filed on Aug. 12, 2021.

(30) Foreign Application Priority Data

Aug. 31, 2020   (CN) .................. 202010907536.7

(51) Int. Cl.
G02B 5/00      (2006.01)
G02B 6/122     (2006.01)
H01Q 1/38      (2006.01)

(52) U.S. Cl.
CPC ........... *G02B 5/008* (2013.01); *G02B 6/1226* (2013.01); *H01Q 1/38* (2013.01)

(58) Field of Classification Search
CPC ........ G02B 5/008; G02B 6/1226; H01Q 1/38; H01P 3/10; H01P 5/08; H01P 3/085; H01P 3/081
See application file for complete search history.

(56) References Cited

U.S. PATENT DOCUMENTS

| | | | |
|---|---|---|---|
| 2003/0179974 A1* | 9/2003 | Estes ............ | B82Y 20/00 385/2 |
| 2012/0133454 A1* | 5/2012 | Wu ............... | H01P 3/08 333/33 |
| 2018/0076376 A1* | 3/2018 | Brady ............ | H01Q 1/48 |

FOREIGN PATENT DOCUMENTS

| | | | | |
|---|---|---|---|---|
| CN | 110311195 A | | 10/2019 | |
| CN | 110718731 A | * | 1/2020 | ............. H01P 3/081 |

OTHER PUBLICATIONS

Yan Rui Ting et al: "A Broadband and High-Efficiency Compact Transition From Microstrip Line to Spoof Surface Plasmon Polaritons", IEEE Microwave and Wireless Components Letters, IEEE Service Center. New York. NY, US, vol. 30, No. 1, Dec. 23, 2019 (Dec. 23, 2019), pp. 23-26, XP011766351.

(Continued)

*Primary Examiner* — Amit Chatly
(74) *Attorney, Agent, or Firm* — HAUPTMAN HAM, LLP

(57) ABSTRACT

This application provides a spoof surface plasmon polariton transmission line structure, a circuit board, and an electronic device, to reduce a size of the SSPP transmission line structure. The SSPP transmission line structure includes a first dielectric substrate, a first metal strip, and a second metal strip. The first metal strip and the second metal strip are respectively disposed on two opposite surfaces of the first dielectric substrate, the first metal strip and the second metal strip separately extend in a first direction, and a length of the first metal strip in the first direction is less than a length of the second metal strip in the first direction. In the first direction, a cross-sectional area of the first metal strip gradually decreases, and at least one side of the second metal strip has a plurality of protrusion parts spaced apart.

29 Claims, 9 Drawing Sheets

(56) References Cited

OTHER PUBLICATIONS

Wang Meng et al: "Supercompact and Ultrawideband Surface Plasmonic Bandpass Filter", IEEE Transactions on Microwave Theory and Techniques, IEEE, USA, vol. 68, No. 2, Feb. 1, 2020 (Feb. 1, 2020), pp. 732-740, XP011769865.
Extended European Search Report issued in corresponding European Application No. 21860157.3, dated Jan. 22, 2024, pp. 1-11.

* cited by examiner

SPOOF SURFACE PLASMON POLARITON TRANSMISSION LINE STRUCTURE, CIRCUIT BOARD, AND ELECTRONIC DEVICE

CROSS-REFERENCE TO RELATED APPLICATIONS

This application is a continuation of International Application No. PCT/CN2021/112217, filed on Aug. 12, 2021, which claims priority to Chinese Patent Application No. 202010907536.7, filed on Aug. 31, 2020. The disclosures of the aforementioned applications are hereby incorporated by reference in their entireties.

TECHNICAL FIELD

This application relates to the field of microwave technologies, and in particular, to a spoof surface plasmon polariton transmission line structure, a circuit board, and an electronic device.

BACKGROUND

A spoof surface plasmon polariton (spoof surface plasmon polariton, SSPP for short) is a special electromagnetic wave mode excited on a surface of a specific periodic structure in a frequency band such as a microwave or a terahertz wave. Compared with a naturally existing surface plasmon polariton (surface plasmon polariton, SPP for short), the SSPP has features such as a high binding capability, a low loss, a short operating wavelength, and easy conformal transmission, and therefore attracts wide attention. A periodic metal structure for propagating the SSPP may be referred to as an SSPP transmission line. In recent years, with deepening of research, the SSPP transmission line gradually evolves from a three-dimensional structure into a two-dimensional structure, so that the SSPP transmission line can be processed by using a modern printed circuit board process, thereby promoting a low-cost, scaled, and practical process.

To connect the SSPP transmission line to an existing microwave transmission line, currently, a coplanar waveguide is usually used to perform conversion on the microwave transmission line, or a form of a transmission line such as a coaxial waveguide, a microstrip, or a slot line is used. A disadvantage of these transmission structures is that relatively large space needs to be occupied and an overall width is several times a width of the SSPP transmission line. This is not conducive to a compact integrated design of a device.

SUMMARY

This application provides a spoof surface plasmon polariton transmission line structure, a circuit board, and an electronic device, to reduce a size of the spoof surface plasmon polariton transmission line structure.

According to a first aspect, this application provides an SSPP transmission line structure. The SSPP transmission line structure may include a first dielectric substrate, a first metal strip, and a second metal strip. The first dielectric substrate may be configured to support and fasten the first metal strip and the second metal strip. The first metal strip and the second metal strip are respectively disposed on two opposite surfaces of the first dielectric substrate. The first metal strip and the second metal strip separately extend in a first direction. In the first direction, a length of the first metal strip is less than a length of the second metal strip, and a cross-sectional area of the first metal strip gradually decreases until the cross-sectional area of the first metal strip is zero. At least one side of the second metal strip has a plurality of protrusion parts spaced apart, and the periodically disposed protrusion parts have corresponding signal operating frequencies. In a process in which the first metal strip gradually changes and disappears, original signal energy distributed between the first metal strip and the second metal strip is gradually coupled to the second metal strip, so that the second metal strip finally forms an SSPP transmission line having a single-layer metal structure.

In the foregoing solution, the SSPP transmission line structure can couple signal energy in a vertical direction by using the first metal strip and the second metal strip that are spatially laminated, to finally concentrate the signal energy onto the second metal strip, so that the second metal strip forms an SSPP transmission line having a single-layer metal structure. Compared with a manner in which energy is coupled in a horizontal direction by using a coplanar waveguide in the conventional technology, in this solution, a width of the SSPP transmission line structure can be reduced, thereby achieving an effect of reducing occupied circuit space.

In a specific implementation, the SSPP transmission line structure may further include a second dielectric substrate and a third metal strip. The second dielectric substrate may be laminated on a surface that is of the first dielectric substrate and on which the second metal strip is disposed, and the third metal strip may be disposed on a surface that is of the second dielectric substrate and that faces away from the first dielectric substrate, so that the third metal strip and the second metal strip can be spaced apart by the second dielectric substrate. During specific disposition, the third metal strip may also extend in the first direction. In the first direction, a length of the third metal strip is less than the length of the second metal strip, and a cross-sectional area of the third metal strip gradually decreases. In this way, in a process in which the first metal strip and the third metal strip gradually change and disappear, original signal energy distributed between the second metal strip and the third metal strip is also gradually coupled to the second metal strip, so that the second metal strip finally forms an SSPP transmission line having a single-layer metal structure.

To reduce manufacturing costs of the SSPP transmission line structure and improve manufacturing accuracy of the SSPP transmission line structure, in some possible implementations, graphics of the first metal strip, the second metal strip, and the third metal strip may be separately formed by using an etching process.

In a specific implementation, in the first direction, the second metal strip may include a first segment and a second segment that are connected to each other. In the first segment, areas of protrusion parts may gradually increase as the second metal strip extends. After signal energy between the first metal strip and the second metal strip and between the second metal strip and the third metal strip is gradually coupled to the second metal strip, an area of a protrusion part increases to a specified value, and the second metal strip transitions from the first segment to the second segment. In the second segment, areas of protrusion parts are stabilized at the specified value, and signal energy may be concentrated onto the second segment, that is, the second segment forms an SSPP transmission line having a single-layer metal structure.

In a specific implementation, protrusion parts on a same side of the second metal strip may be approximately evenly spaced apart, to improve signal transmission quality.

When protrusion parts are separately disposed on two sides of the second metal strip, in a specific implementation, the first metal strip and the third metal strip each have a first end and a second end at opposite positions in the first direction. A first notch may be disposed at a first end of the first metal strip. The first notch extends toward a first end of the first metal strip, and divides the first metal strip into a first branch and a second branch. In the first direction, a width of the first branch and a width of the second branch gradually decrease until the width of the first branch and the width of the second branch decrease to zero at the second end of the first metal strip, thereby implementing a rule that the cross-sectional area of the first metal strip gradually decreases. Similarly, a second notch may be disposed at a first end of the third metal strip. The second notch extends toward a first end of the third metal strip, and divides the third metal strip into a third branch and a fourth branch. In the first direction, a width of the third branch and a width of the fourth branch gradually decrease until the width of the third branch and the width of the fourth branch decrease to zero at the second end of the third metal strip, thereby implementing a rule that the cross-sectional area of the third metal strip gradually decreases.

In another specific implementation, in the first direction, two side surfaces of the first metal strip may gradually approach each other until intersection, to implement a gradual decrease of a width of the first metal strip. Similarly, two side surfaces of the third metal strip may also gradually approach each other until intersection, to implement a gradual decrease of a width of the third metal strip.

During specific designing, in the first direction, the width of the first metal strip may stepwise decrease; the width of the first metal strip may linearly decrease; or the two side surfaces of the first metal strip may be separately designed as arc surfaces, and in a process in which the two side surfaces of the first metal strip gradually approach each other until intersection, the width of the third metal strip nonlinearly decreases. Similarly, in the first direction, the width of the third metal strip may stepwise decrease; the width of the third metal strip may linearly decrease; or the two side surfaces of the third metal strip may be separately designed as arc surfaces, and in a process in which the two side surfaces of the third metal strip gradually approach each other until intersection, the width of the third metal strip nonlinearly decreases.

In addition, when protrusion parts are separately disposed on two sides of the second metal strip, there may be a same quantity of protrusion parts or different quantities of a plurality of protrusion parts on the two sides of the second metal strip. This is not specifically limited in this application. When there are equal quantities of a plurality of protrusion parts on the two sides of the first metal strip, positions of the plurality of protrusion parts on the two sides may be disposed in an opposite manner, or may be disposed in a staggered manner.

In a specific implementation, the first metal strip and the third metal strip each may include a first side and a second side. The first side may be a same side as a protrusion side that is of the second metal strip and on which protrusion parts are disposed. During specific disposition, a second side of the first metal strip gradually inclines toward a first side of the first metal strip and intersects with the first side of the first metal strip, to implement a gradual decrease in a width. A second side of the third metal strip may also gradually incline toward a first side of the third metal strip and intersect with the first side of the third metal strip, to implement a gradual decrease in a width.

In addition, to improve signal transmission quality and improve signal energy coupling efficiency, a vertical projection of the first metal strip on the second dielectric substrate may overlap the third metal strip.

When the first metal strip is disposed on the first dielectric substrate, the first metal strip may be attached to a surface of the first dielectric substrate, or the first metal strip may be embedded in a surface of the first dielectric substrate, provided that the first metal strip can be fastened to the surface of the first dielectric substrate.

Similarly, the second metal strip may be attached between the first dielectric substrate and the second dielectric substrate, the second metal strip may be embedded in a surface of the first dielectric substrate, the second metal strip may be embedded in a surface of the first dielectric substrate, or one part of the second metal strip may be embedded in the first dielectric substrate and the other part of the second metal strip may be embedded in the second dielectric substrate, provided that the second dielectric substrate can be fastened between the first dielectric substrate and the second dielectric substrate.

When the third metal strip is disposed on the second dielectric substrate, the third metal strip may be attached to a surface of the second dielectric substrate, or the third metal strip may be embedded in a surface of the second dielectric substrate, provided that the third metal strip can be fastened to the surface of the second dielectric substrate.

According to a second aspect, this application further provides a circuit board. The circuit board may include the SSPP transmission line structure in any one of the foregoing possible implementations. In an interconnection scenario of transmission lines inside a microwave circuit including a multi-layer board, the SSPP transmission line structure 100 may be used for conversion between the transmission lines inside the circuit board, to simplify a circuit structure. For example, as shown in FIG. 23, for a multi-layer board with a complex circuit structure and a relatively long transmission distance, the SSPP transmission line structure 100 may couple a stripline with a shield layer to the spoof surface plasmon polariton transmission line structure, to implement single-layer transmission, so that a structure of the circuit board is simpler. In addition, because an SSPP transmission line has a relatively large phase velocity, this conversion form can further shorten a length of a phase delay line, so that an overall circuit structure is more compact.

In addition, the circuit board may further include an interface. The interface may be a coaxial cable connector connected to a coaxial transmission line outside the circuit board. The SSPP transmission line structure may be coupled to the connector, to perform conversion between the coaxial transmission line and an SSPP transmission line on the circuit board. During specific implementation, a first metal strip of the transmission line structure may be coupled to an outer conductor of the coaxial transmission line by using the interface, and a second metal strip may be coupled to an inner conductor of the coaxial transmission line by using the interface, so that a signal of the coaxial transmission line can be transmitted to the SSPP transmission line structure. Then, signal energy is coupled to the second metal strip by using a conversion function of the SSPP transmission line structure, so that the second metal strip can finally form an SSPP transmission line having a single-layer metal structure on the circuit board.

According to a third aspect, this application further provides an electronic device. The electronic device may include the circuit board in the foregoing solution. Conversion between a coaxial transmission line outside the electronic device and an SSPP transmission line on the circuit board may be performed by using a transmission line structure on the circuit board.

REFERENCE SIGNS

100—SSPP transmission line structure; 10—First dielectric substrate; 20—First metal strip; 30—Second metal strip;
31—Protrusion part; 40—Second dielectric substrate; 50—Third metal strip; 21—First notch; 22—First branch;
23—Second branch; 24—First side; 25—Second side; 200—Electronic device; 300—Circuit board; 310—Interface;
400—Coaxial transmission line.

DESCRIPTION OF EMBODIMENTS

To facilitate understanding of embodiments of this application, the following first describes an application scenario of the embodiments of this application. An SSPP transmission line structure provided in the embodiments of this application may be applied to an electronic device. The SSPP transmission line structure may be used for connection between an outside coaxial transmission line and an SSPP transmission line inside the electronic device, for example, conversion between a radio frequency interface of a radio base station and a transmission line internally/externally connected to a high-frequency signal data collection front-end or the like, or may be used for intra-circuit transmission line conversion, for example, coupling between a stripline with a shield layer and the spoof surface plasmon polariton transmission line structure, to implement single-layer transmission. The electronic device may be a receiver, a transmitter, an antenna, or the like in the conventional technology, for example, a television transmitter applied to the field of the internet of things. In a currently-used conversion structure, conversion is usually implemented in a form of a coplanar waveguide. In this conversion form, a volume is relatively large, and therefore relatively large installation space needs to be occupied. This is not conducive to implementing a miniaturization design of the electronic device.

Based on this, the embodiments of this application provide an SSPP transmission line structure. The SSPP transmission line structure enables different metal strips to be coupled in a vertical direction. Compared with a conversion form in which coupling is performed in a horizontal direction by using a coplanar waveguide in the conventional technology, a width of the SSPP transmission line structure can be significantly reduced, thereby achieving an effect of saving circuit board space. The following describes, with reference to the accompanying drawings, the SSPP transmission line structure provided in the embodiments of this application.

Figure 1:
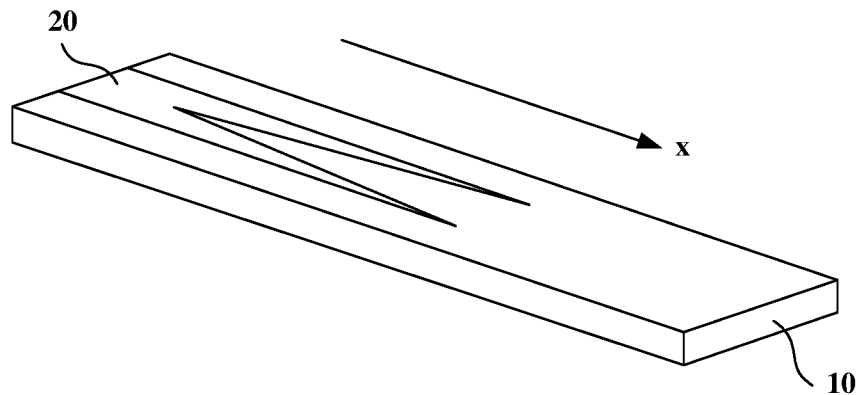
FIG. 1 is a schematic diagram of an SSPP transmission line structure according to an embodiment of this application.
Figure 2:
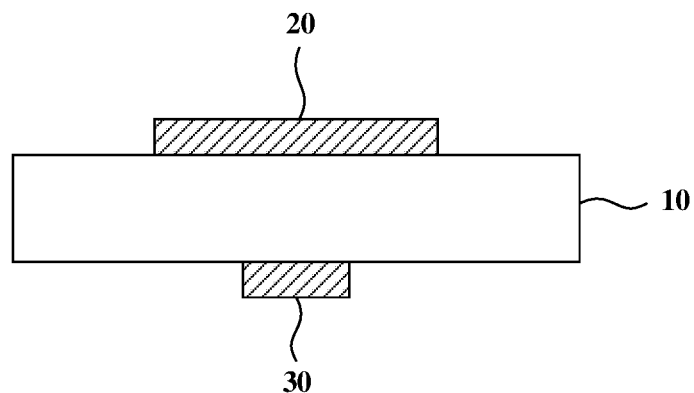
FIG. 2 is a cross-sectional view that is of the SSPP transmission line structure in FIG. 1 and that is perpendicular to a first direction.

First, refer to FIG. 1 and FIG. 2. FIG. 1 is a schematic diagram of an SSPP transmission line structure according to an embodiment of this application. FIG. 2 is a cross-sectional view that is of the SSPP transmission line structure in FIG. 1 and that is perpendicular to a first direction. The SSPP transmission line structure 100 may include a first dielectric substrate 10, a first metal strip 20, and a second metal strip 30. The first dielectric substrate 10 may be configured to support and fasten the first metal strip 20 and the second metal strip 30. During specific implementation, the first metal strip 20 and the second metal strip 30 may be respectively disposed on two opposite surfaces of the first dielectric substrate 10. In this way, the two metal strips can be spaced apart by using the first dielectric substrate 10, and therefore can be in a spatially laminated state.

The first dielectric substrate 10 may be a flexible substrate, or may be a rigid substrate. This is not limited in this application, and may be set based on an actual requirement. When the first dielectric substrate 10 is a flexible substrate, a material of the first dielectric substrate 10 may be a polyimide (polyimide, PI for short), modified polyimide (modified polyimide, MPI for short), a liquid crystal polymer (liquid crystal polymer, LCP for short), or the like. When the first dielectric substrate 10 is a rigid substrate, a material of the first dielectric substrate 10 may be epoxy resin, ceramic, glass, phenolic cotton paper, or the like.

Figure 3:
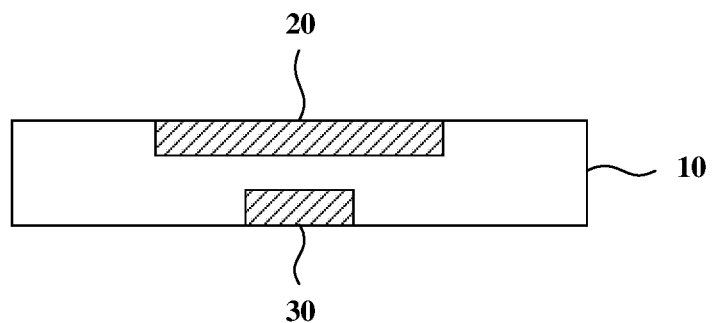
FIG. 3 is a cross-sectional view that is of another SSPP transmission line structure and that is perpendicular to a first direction according to an embodiment of this application.

Then, referring to FIG. 2, in an embodiment of this application, the first metal strip 20 and the second metal strip 30 may be respectively attached to two side surfaces of the first dielectric substrate 10. Alternatively, as shown in FIG. 3, in another SSPP transmission line structure provided in an embodiment of this application, the first metal strip 20 and the second metal strip 30 may be respectively embedded in two side surfaces of the first dielectric substrate. Alternatively, the first metal strip 20 and the second metal strip 30 may be respectively fastened to the first dielectric substrate 10 in an attachment manner and an embedding manner.

In addition, to reduce manufacturing costs of the SSPP transmission line structure and improve manufacturing accuracy of the SSPP transmission line structure, in some embodiments of this application, graphics of the first metal strip 20 and the second metal strip 30 may be separately formed by using an etching process.

Figure 4:
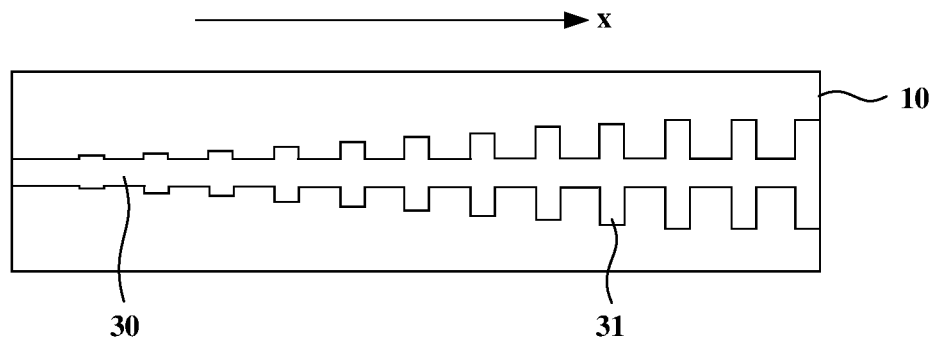
FIG. 4 is a bottom view of a first dielectric substrate according to an embodiment of this application.
Figure 5:
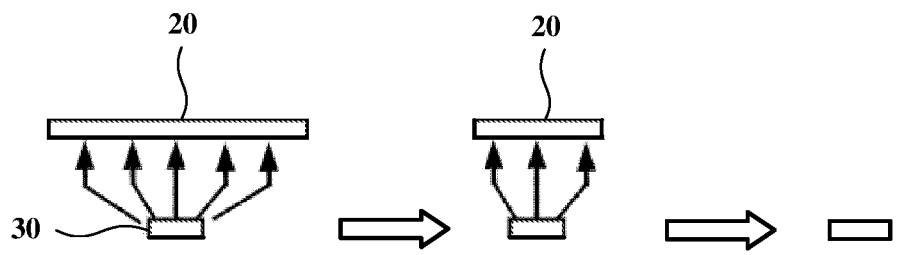
FIG. 5 is a schematic diagram of distribution of an electric field vector at a moment in an electric field change period in an SSPP transmission line structure according to an embodiment of this application.

FIG. 4 is a bottom view of a first dielectric substrate according to an embodiment of this application. Referring to FIG. 1 and FIG. 4 together, the first metal strip 20 and the second metal strip 30 may separately extend in the first direction (x direction). At least one side of the second metal strip 30 has a plurality of protrusion parts 31 spaced apart. A cross-sectional area of the first metal strip 20 gradually decreases to zero as an extension length increases, that is, the first metal strip 20 gradually disappears in the first direction, and a length of the first metal strip 20 in the first direction is less than a length of the second metal strip 30 in the first direction. It may be understood that the first direction is a signal transmission direction in the SSPP transmission line structure. The second metal strip 30 is coupled and excites a mode required by an SSPP transmission line. Referring to FIG. 5 together, an electric field vector may vary with a shape of the first metal strip 20, and the periodically disposed protrusion parts 31 have corresponding signal operating frequencies. In a process in which the first metal strip 20 gradually changes and disappears, original signal energy mainly distributed between the first metal strip 20 and the second metal strip 30 is gradually coupled to the second metal strip 30, so that the second metal strip 30 finally forms an SSPP transmission line having a single-layer metal structure. It can be learned that, compared with a manner in which energy is coupled in a horizontal direction by using a coplanar waveguide in the conventional technology, in the solution in this embodiment of this application, correlation between different metal conductors may be converted to a vertical direction, so that a width of the SSPP transmission line structure can be reduced, thereby achieving an effect of reducing occupied circuit space.

It should be noted that FIG. 5 is a diagram of distribution of an electric field at a moment in an electric field change period in the SSPP transmission line structure. A direction of an arrow may be understood as a direction of an electric field in a half period in which the moment is located. It may be understood that, in the other half period of the same period, a direction of an electric field in the SSPP transmission line structure is opposite to the direction of the electric field shown in FIG. 5.

Figure 6:
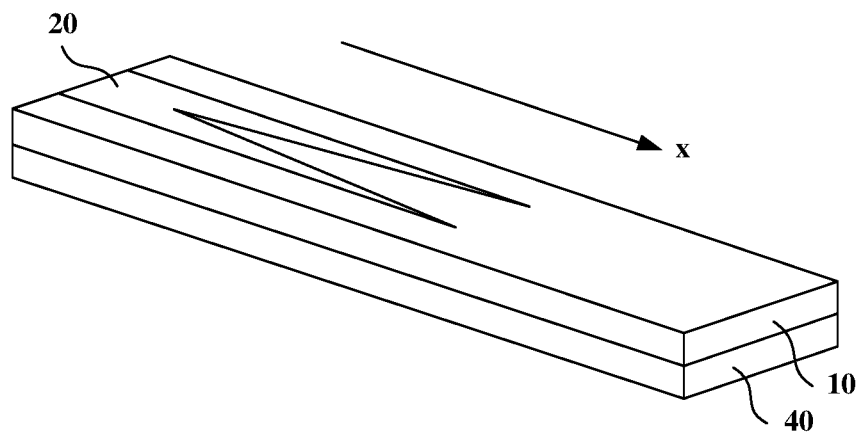
FIG. 6 is a schematic diagram of another SSPP transmission line structure according to an embodiment of this application.
Figure 7:
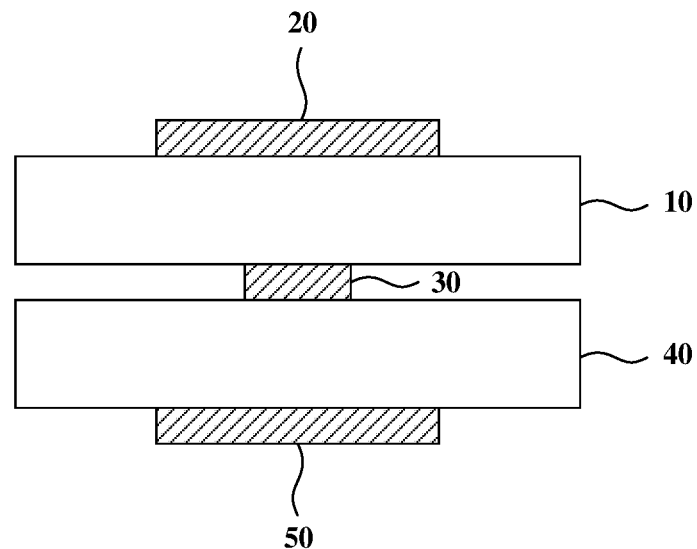
FIG. 7 is a cross-sectional view that is of the SSPP transmission line structure in FIG. 6 and that is perpendicular to a first direction.

FIG. 6 is a schematic diagram of another SSPP transmission line structure according to an embodiment of this application. FIG. 7 is a cross-sectional view that is of the SSPP transmission line structure in FIG. 6 and that is perpendicular to a first direction. In this embodiment, the SSPP transmission line structure may further include a second dielectric substrate 40 and a third metal strip 50. The second dielectric substrate 40 may be laminated on a surface that is of the first dielectric substrate 10 and on which the second metal strip 30 is disposed, and the third metal strip 50 may be disposed on a surface that is of the second dielectric substrate 40 and that faces away from the first dielectric substrate 10. In this case, the first metal strip 20 and the second metal strip 30 may be spaced apart by using the first dielectric substrate 10, and the second metal strip 30 and the third metal strip 50 may be spaced apart by using the second dielectric substrate 40, so that the three metal strips can be in a spatially laminated state.

Similarly, the second dielectric substrate 40 may also be a flexible substrate or a rigid substrate. This is not limited in this application, and may be set based on an actual requirement. For an optional material of the second dielectric substrate 40, refer to the foregoing description of the first dielectric substrate 10. Details are not described herein. In addition, a thickness of the second dielectric substrate 40 may be or may not be equal to a thickness of the first dielectric substrate 10. This is also not limited in this application, and may also be set based on an actual requirement.

Figure 8:
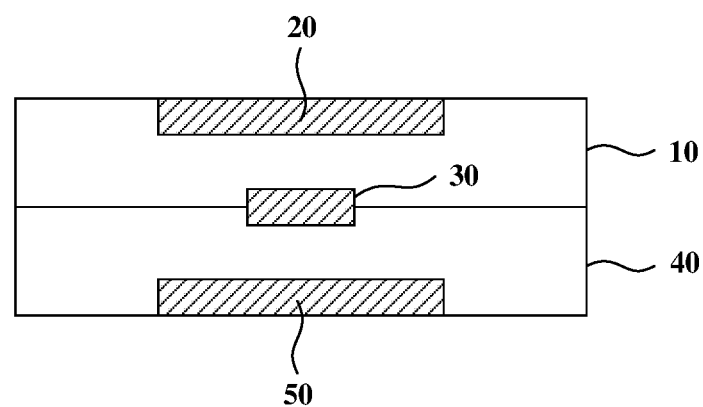
FIG. 8 is a cross-sectional view that is of another SSPP transmission line structure and that is perpendicular to a first direction according to an embodiment of this application.

The third metal strip 50 may be alternatively fastened to a surface of the second dielectric substrate 40 in an adhesive manner or an embedding manner. Referring to FIG. 7, in an embodiment of this application, the third metal strip 50 may be attached to a surface of the second dielectric substrate 40. Similarly, the first metal strip 20 may also be attached to a surface of the first dielectric substrate 10, and the second metal strip 30 may be attached between the first dielectric substrate 10 and the second dielectric substrate 40. Alternatively, as shown in FIG. 8, in another SSPP transmission line structure provided in an embodiment of this application, the third metal strip 50 may be embedded in a surface of the second dielectric substrate 40; the first metal strip 20 may also be embedded in a surface of the first dielectric substrate 10; and the second metal strip 30 may be embedded in a surface of the first dielectric substrate 10, the second metal strip 30 may be embedded in a surface of the second dielectric substrate 40, or one part of the second metal strip 30 may be embedded in the first dielectric substrate 10 and the other part of the second metal strip 30 may be embedded in the second dielectric substrate 40.

In addition, a graphic of the third metal strip 50 may also be formed by using an etching process, to further reduce manufacturing costs of the SSPP transmission line structure and improve manufacturing precision of the SSPP transmission line structure.

Figure 9:
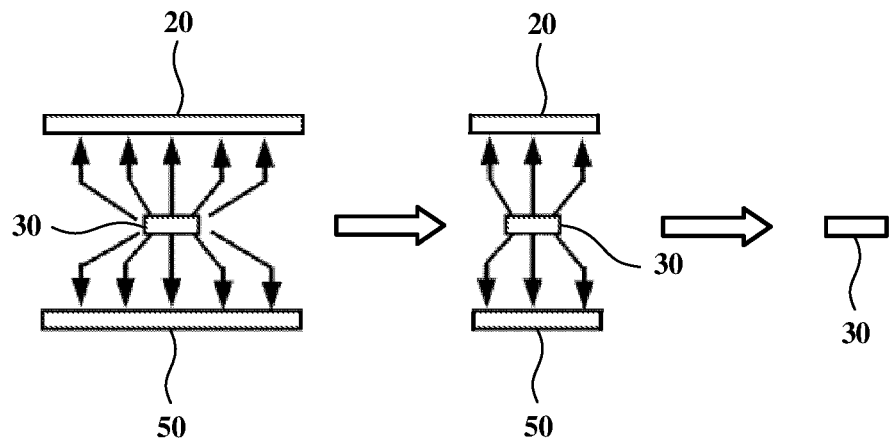
FIG. 9 is a schematic diagram of distribution of an electric field vector at a moment in an electric field change period in another SSPP transmission line structure according to an embodiment of this application.

During specific disposition, the third metal strip 50 may also extend in the first direction (x direction), and a cross-sectional area of the third metal strip 50 gradually decreases to zero as an extension length increases, that is, the third metal strip 50 gradually disappears in the first direction, and a length of the third metal strip 50 in the first direction is less than the length of the second metal strip 30 in the first direction. In this embodiment, the SSPP transmission line structure is fed by using a stripline, to couple the second metal strip 30 and excite a mode required by an SSPP transmission line. Referring to FIG. 9 together, an electric field vector may vary with a shape of the first metal strip 20 and a shape of the third metal strip 50, and the periodically disposed protrusion parts have corresponding signal operating frequencies. In a process in which the first metal strip 20 and the third metal strip 50 gradually change and disappear, original signal energy distributed between the first metal strip 20 and the second metal strip 30 and between the second metal strip 30 and the third metal strip 50 is gradually coupled to the second metal strip 30, so that the second metal strip 30 finally forms an SSPP transmission line having a single-layer metal structure.

Similarly, FIG. 9 is a diagram of distribution of an electric field at a moment in an electric field change period in the SSPP transmission line structure. A direction of an arrow may be understood as a direction of an electric field in a half period in which the moment is located. It may be understood that, in the other half period of the same period, a direction of an electric field in the SSPP transmission line is opposite to the direction of the electric field shown in FIG. 9.

Figure 10:
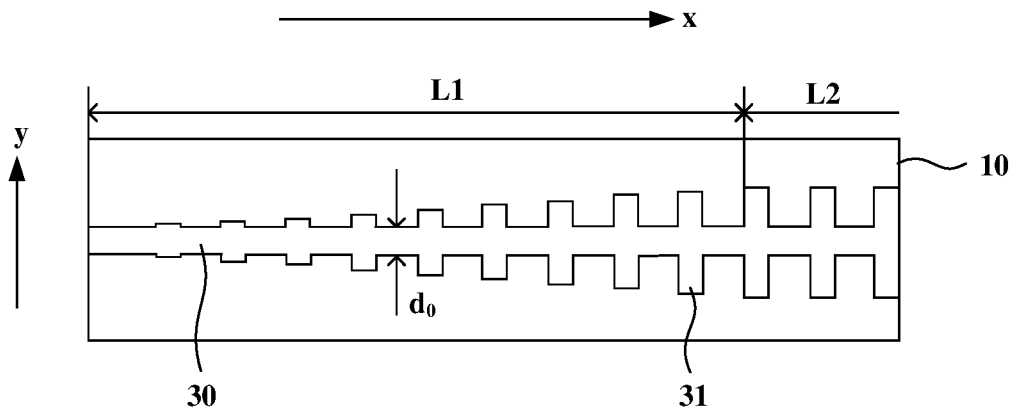
FIG. 10 is a bottom view of a first dielectric substrate shown in FIG. 6.

Referring to FIG. 10, when the second metal strip 30 is disposed, protrusion parts on the second metal strip 30 may have equal or unequal areas. This is not limited in this application. In some possible embodiments, in the first direction, the second metal strip 30 may include a first segment L1 and a second segment L2 that are connected to each other. In the first segment L1, areas of protrusion parts 31 may gradually increase as the second metal strip 30 extends. After signal energy between the first metal strip 20 and the second metal strip 30 and between the second metal strip 30 and the third metal strip 50 is gradually coupled to the second metal strip 30, an area of a protrusion part 31 increases to a specified value, and the second metal strip 30 transitions from the first segment L1 to the second segment L2. In the second segment L2, areas of protrusion parts 31 are stabilized at the specified value, and signal energy may be concentrated onto the second segment L2, that is, the second segment L2 forms an SSPP transmission line having a single-layer metal structure.

Protrusion parts 31 may be disposed on one side of the second metal strip 30, for example, a left side or a right side of the second metal strip 30, or may be separately located on a left side and a right side of the second metal strip 30. During specific implementation, protrusion parts 31 on a same side of the second metal strip 30 may be approximately evenly spaced apart, that is, a spacing between any two adjacent protrusion parts may be approximately equal, and a specific difference is allowed, provided that the difference falls within an error tolerance range. A specific spacing length may fall with a range of 1.8 mm to 2.2 mm, for example, may be 1.8 mm, 2.0 mm, or 2.2 mm. This is not limited in this application. In addition, the protrusion parts 31 may have equal or unequal area increase amplitude. This is also not limited in this application. Specific increase amplitude may be set based on parameters such as a frequency of a signal that actually needs to be transmitted.

In a specific implementation of this application, a shape of the protrusion part 31 may be a rectangle. In this case, an area of the protrusion part 31 can be changed by changing a length of the protrusion part 31 in a second direction (y direction) perpendicular to the first direction, namely, a protruding length of the protrusion part 31. Optionally, in the second segment L2, a protruding length of the protrusion part 31 may be 0.8 mm Certainly, in another embodiment of this application, the shape of the protrusion part 31 may be alternatively an arc, a triangle, any other polygon, or the like. This is not specifically limited in this application.

Specific structural forms of the first metal strip 20 and the third metal strip 50 are not limited. It may be understood that, in the first direction, when a thickness of the first metal strip 20 and a thickness of the third metal strip 50 are unchanged, the cross-sectional area of the first metal strip 20 and the cross-sectional area of the third metal strip 50 may be determined based on a width of the first metal strip 20 and a width of the third metal strip 50 in the first direction. Therefore, the cross-sectional area of the first metal strip 20 and the cross-sectional area of the third metal strip 50 can be reduced by reducing the width of the first metal strip 20 and the width of the third metal strip 50. During specific implementation, the width of the first metal strip 20 and the width of the third metal strip 50 may be reduced in a plurality of forms. For example, the form includes but is not limited to linear reduction, arc reduction, or stepped reduction. In addition, the shape of the first metal strip 20 may be the same as or may be different from the shape of the third metal strip 50. This is not limited in this application, provided that the first metal strip 20 and the third metal strip 50 can separately implement tendencies in which the cross-sectional area of the first metal strip 20 and the cross-sectional area of the third metal strip 50 gradually decrease. It should be noted that when the shape of the first metal strip 20 is the same as the shape of the third metal strip 50, a vertical projection of the first metal strip 20 on the second dielectric substrate may overlap the third metal strip 50.

The following uses an example in which protrusion parts 31 are disposed on both the left side and the right side of the second metal strip 30, to describe specific structures of the first metal strip 20 and the third metal strip 50 in cases of using several different reduction forms.

Figure 11:
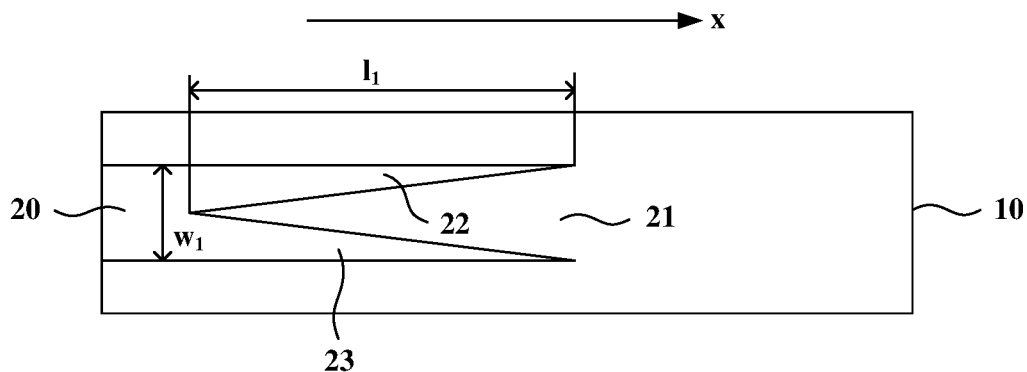
FIG. 11 is a top view of the SSPP transmission line structure shown in FIG. 6.

Refer to FIG. 6 and FIG. 11 together. FIG. 11 is a top view of the SSPP transmission line structure shown in FIG. 6. In this embodiment, the first metal strip 20 may include a first end and a second end at opposite positions. A first notch 21 may be disposed at a second end of the first metal strip 20. The first notch 21 extends toward the first end of the first metal strip 20 (extends in a −x direction), and a width of the first notch 21 gradually decreases to zero in the direction in which the first notch 21 extends. In this way, the first notch 21 can divide the first metal strip 20 into a first branch 22 and a second branch 23. Correspondingly, in the first direction, a width of the first branch 22 and a width of the second branch 23 gradually decrease until the width of the first branch 22 and the width of the second branch 23 decrease to zero at the second end of the first metal strip 20. Similarly, the third metal strip may also include a first end and a second end at opposite positions. A second notch may be disposed at the second end of the third metal strip. The second notch extends toward the first end of the third metal strip, and a width of the second notch gradually decreases to zero in the direction in which the second notch extends. In this way, the second notch can divide the third metal strip into a third branch and a fourth branch. Correspondingly, in the first direction, a width of the third branch and a width of the fourth branch gradually decrease until the width of the third branch and the width of the fourth branch decrease to zero at the second end of the third metal strip. In a process in which the first metal strip and the third metal strip gradually change and disappear, original signal energy distributed between the first metal strip and the second metal strip and between the second metal strip and the third metal strip is gradually coupled to the second metal strip, so that the second metal strip finally forms an SSPP transmission line having a single-layer metal structure.

In this embodiment of this application, a width d0 of the second metal strip may fall within a range of 0.25 mm to 0.35 mm. For example, d0 may be 0.25 mm, 0.3 mm, or 0.35 mm. An initial width (a width of the first end of the first metal strip) w1 of the first metal strip 20 may fall within a range of 2.9 mm to 3.1 mm. For example, w1 may be 2.9 mm, 3.0 mm, or 3.1 mm Lengths l1 of the first branch 22 and the second branch 23 may fall within a range of 15 mm to 17 mm. For example, l1 may be 15 mm, 16 mm, or 17 mm. A size setting of the third metal strip is similar to the size setting of the first metal strip 20, and details are not described herein.

Figure 12:
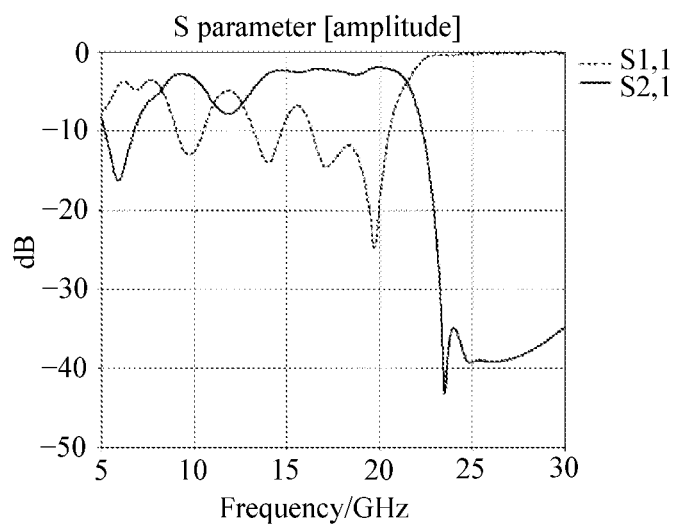
FIG. 12 is a line graph of an S-parameter simulation result of an interconnection model of the SSPP transmission line structure shown in FIG. 6.

FIG. 12 is a line graph of an S-parameter simulation result of an interconnection model of the SSPP transmission line structure shown in FIG. 6 in a frequency band from 5 GHz to 30 GHz. A dotted-line curve S1, 1 represents a reflection factor, and a solid-line curve S2, 1 represents a transmission factor. It can be seen that the SSPP transmission line structure has an S-parameter rule feature of an SSPP transmission line and relatively high transmission efficiency.

Figure 13:
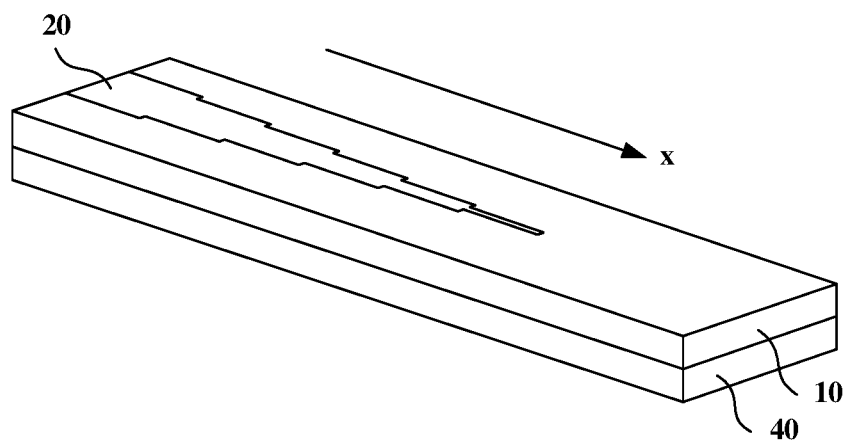
FIG. 13 is a schematic diagram of another SSPP transmission line structure according to an embodiment of this application.
Figure 14:
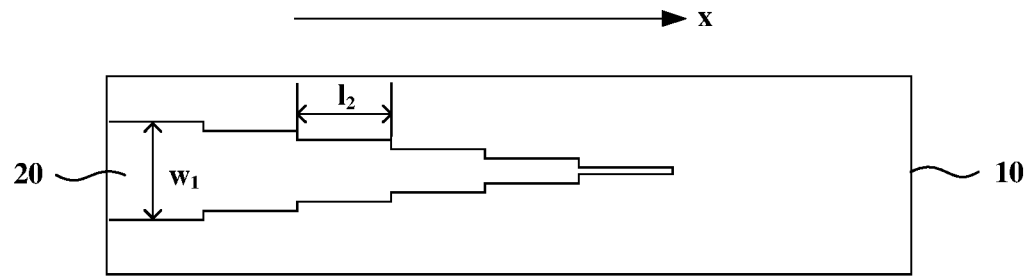
FIG. 14 is a top view of the SSPP transmission line structure shown in FIG. 13.

Refer to FIG. 13 and FIG. 14 together. FIG. 13 is a schematic diagram of another SSPP transmission line structure according to an embodiment of this application. FIG. 14 is a top view of the SSPP transmission line structure shown in FIG. 13. In this embodiment, two sides of the first metal strip 20 and two sides of the third metal strip separately gradually approach each other until intersection, to implement gradual decreases in widths. A width of the first metal strip 20 may stepwise decrease. Similarly, a width of the third metal strip may also stepwise decrease. In a process in which the first metal strip 20 and the third metal strip gradually change and disappear, original signal energy distributed between the first metal strip 20 and the second metal strip and between the second metal strip and the third metal strip is gradually coupled to the second metal strip, so that the second metal strip finally forms an SSPP transmission line having a single-layer metal structure.

During specific implementation, a width d0 of the second metal strip may fall within a range of 0.05 mm to 0.15 mm. For example, d0 may be 0.05 mm, 0.1 mm, or 0.15 mm. An initial width w1 of the first metal strip 20 may fall within a range of 2.7 mm to 2.9 mm. For example, w1 may be 2.7 mm, 2.8 mm, or 2.9 mm. A length l2 of each step of the first metal strip 20 may fall within a range of 2.5 mm to 3.5 mm. For example, l2 may be 2.5 mm, 3.0 mm, or 3.5 mm. A width difference between adjacent steps in the first metal strip 20 may fall within a range of 0.25 mm to 0.35 mm. For example, the width difference may be 0.25 mm, 0.3 mm, or 0.35 mm. A size setting of the third metal strip is similar to the size setting of the first metal strip 20, and details are not described herein.

It has been proved that the SSPP transmission line structure shown in FIG. 13 can achieve a similar working effect to the SSPP transmission line structure shown in FIG. 6.

Figure 15:
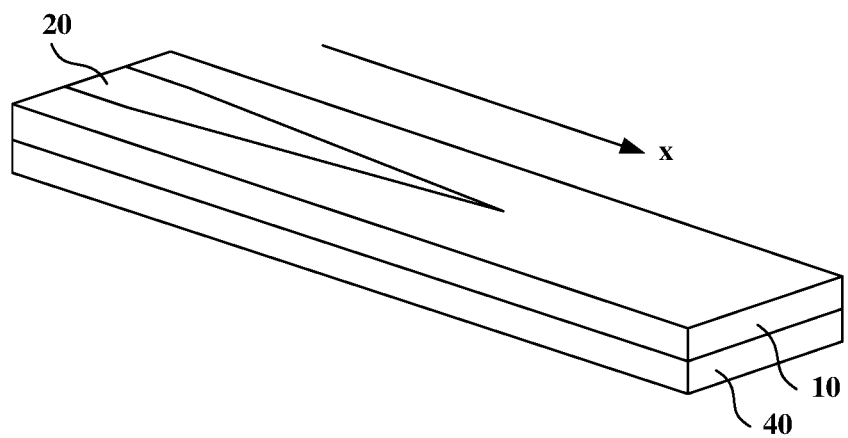
FIG. 15 is a schematic diagram of still another SSPP transmission line structure according to an embodiment of this application.
Figure 16:
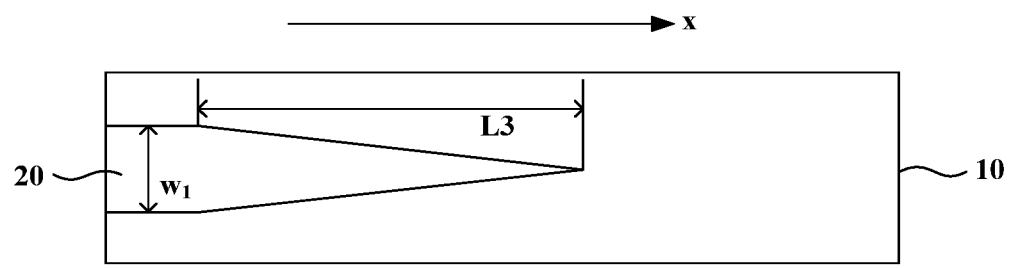
FIG. 16 is a top view of the SSPP transmission line structure shown in FIG. 15.

Refer to FIG. 15 and FIG. 16 together. FIG. 15 is a schematic diagram of still another SSPP transmission line structure according to an embodiment of this application.

FIG. 16 is a top view of the SSPP transmission line structure shown in FIG. 15. In this embodiment, two sides of the first metal strip 20 and two sides of the third metal strip separately gradually approach each other until intersection, to implement gradual decreases in widths. A width of the first metal strip 20 may linearly decrease, that is, in a width gradient segment L3 of the first metal strip 20, a vertical projection of a side surface of the first metal strip 20 on the first dielectric substrate 10 may be a linear type. Similarly, a width of the third metal strip may also linearly decrease. In a process in which the first metal strip 20 and the third metal strip gradually change and disappear, original signal energy distributed between the first metal strip 20 and the second metal strip and between the second metal strip and the third metal strip is gradually coupled to the second metal strip, so that the second metal strip finally forms an SSPP transmission line having a single-layer metal structure.

It should be noted that the width gradient segment L3 of the first metal strip 20 may be understood as a segment that is of the first metal strip 20 and in which the width gradually changes. The width gradient segment L3 may be an entire segment of the first metal strip 20, or may be a segment that is of the first metal strip 20 and that is close to a second end of the first metal strip 20. This is not limited in this application.

During specific implementation, a width d0 of the second metal strip may fall within a range of 0.05 mm to 0.15 mm. For example, d0 may be 0.05 mm, 0.1 mm, or 0.15 mm. An initial width w1 of the first metal strip 30 may fall within a range of 2.7 mm to 2.9 mm. For example, w1 may be 2.7 mm, 2.8 mm, or 2.9 mm. A length of the width gradient segment L3 of the first metal strip 20 may fall within a range of 14 mm to 16 mm. For example, the length of the width gradient segment L3 of the first metal strip 20 may be 14 mm, 15 mm, or 16 mm. A size setting of the third metal strip is similar to the size setting of the first metal strip 20, and details are not described herein.

It has been proved that the SSPP transmission line structure shown in FIG. 15 can achieve a similar working effect to the SSPP transmission line structure shown in FIG. 6.

Figure 17:
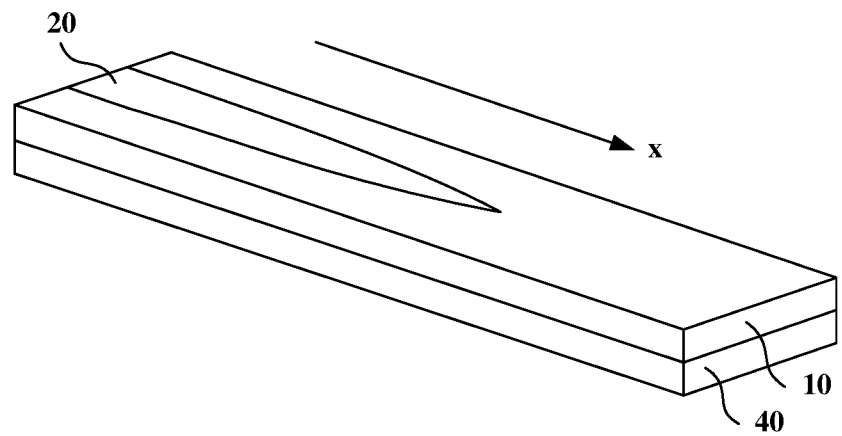
FIG. 17 is a schematic diagram of still another SSPP transmission line structure according to an embodiment of this application.
Figure 18:
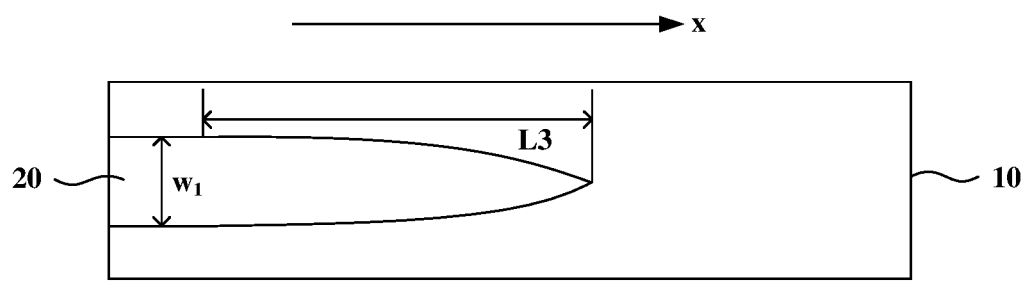
FIG. 18 is a top view of the SSPP transmission line structure shown in FIG. 17.

Refer to FIG. 17 and FIG. 18 together. FIG. 17 is a schematic diagram of still another SSPP transmission line structure according to an embodiment of this application. FIG. 18 is a top view of the SSPP transmission line structure shown in FIG. 17. In this embodiment, two sides of the first metal strip 20 and two sides of the third metal strip separately gradually approach each other until intersection, to implement gradual decreases in widths. In a width gradient segment L3 of the first metal strip 10, a side surface of the first metal strip 10 is an arc surface, that is, a vertical projection of the side surface of the first metal strip 10 on the first dielectric substrate 10 is an arc. Similarly, a side surface of a width gradient segment of the third metal strip may also be an arc surface. In a process in which the first metal strip 20 and the third metal strip gradually change and disappear, original signal energy distributed between the first metal strip 20 and the second metal strip and between the second metal strip and the third metal strip is gradually coupled to the second metal strip, so that the second metal strip finally forms an SSPP transmission line having a single-layer metal structure.

During specific implementation, a width d0 of the second metal strip may fall within a range of 0.05 mm to 0.15 mm. For example, d0 may be 0.05 mm, 0.1 mm, or 0.15 mm. An initial width w1 of the first metal strip may fall within a range of 2.7 mm to 2.9 mm. For example, w1 may be 2.7 mm, 2.8 mm, or 2.9 mm. A length of the width gradient segment L3 of the first metal strip 20 may fall within a range of 14 mm to 16 mm. For example, the length of the width gradient segment L3 of the first metal strip 20 may be 14 mm, 15 mm, or 16 mm. A size setting of the third metal strip is similar to the size setting of the first metal strip 20, and details are not described herein.

It has been proved that the SSPP transmission line structure shown in FIG. 17 can achieve a similar working effect to the SSPP transmission line structure shown in FIG. 6.

Figure 19:
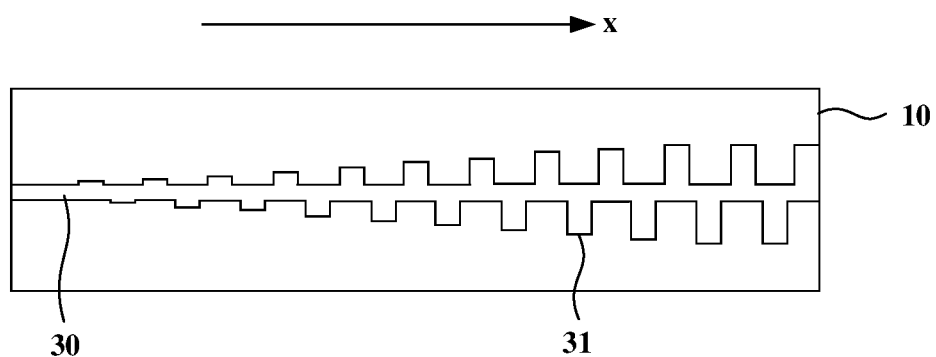
FIG. 19 is a bottom view of another first dielectric substrate according to an embodiment of this application.

In addition, it should be noted that, in the foregoing embodiments, there may be a same quantity of protrusion parts or different quantities of protrusion parts on the two sides of the second metal strip. This is not specifically limited in this application. When there are equal quantities of a plurality of protrusion parts on the two sides of the first metal strip, positions of the plurality of protrusion parts on the two sides may be disposed in an opposite manner, or may be disposed in a staggered manner. Referring to FIG. 19, when the plurality of protrusion parts on the two sides are disposed in a staggered manner, any protrusion part 31 on one side may be at equal distances from two protrusion parts 31 on the other side that are adjacent to the protrusion part 31.

The foregoing describes several structural forms that may be used in the SSPP transmission line structure when the protrusion parts are disposed on both the left side and the right side of the second metal strip. It should be noted that, in some other embodiments of this application, when protrusion parts are disposed on only the left side or the right side of the second metal strip, the first metal strips and the third metal strips of the foregoing various gradient forms may also be used in the SSPP transmission line structure. Details are not described herein. In addition, in a same SSPP transmission line structure, a gradient form of a first metal strip may be the same as or different from a gradient form of a third metal strip. This is not limited in this application.

Figure 20:
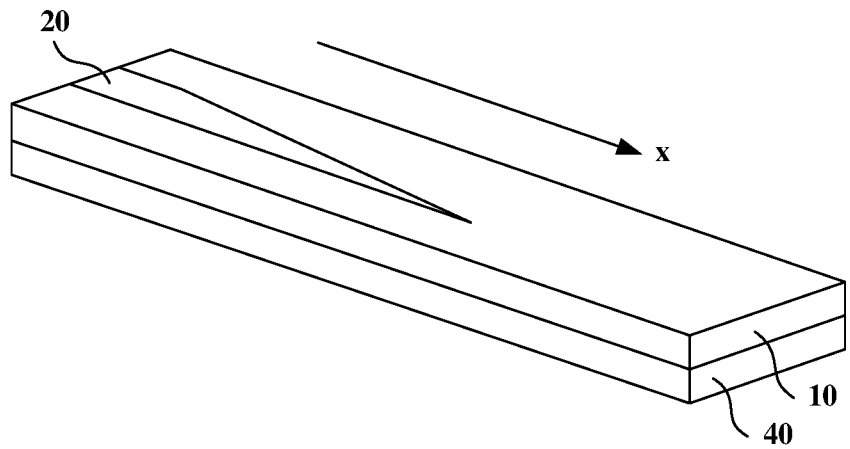
FIG. 20 is a schematic diagram of still another SSPP transmission line structure according to an embodiment of this application.
Figure 21:
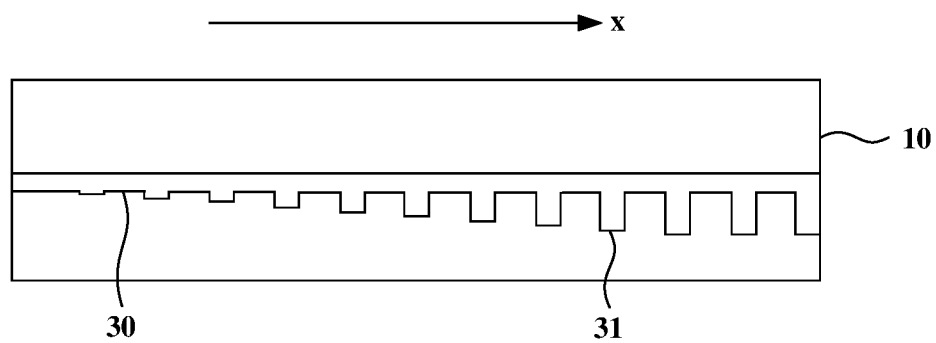
FIG. 21 is a bottom view of a first dielectric substrate in FIG. 20.
Figure 22:
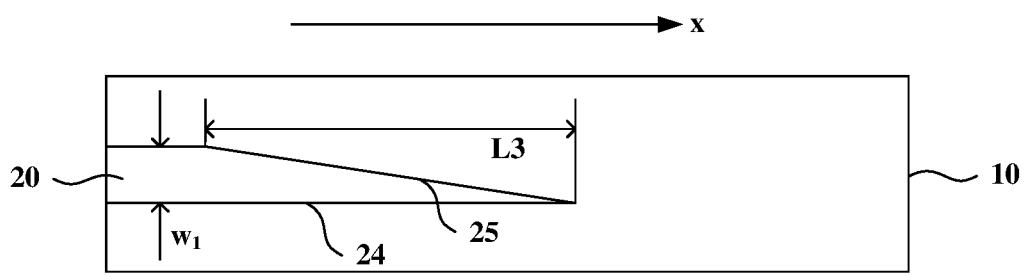
FIG. 22 is a top view of the SSPP transmission line structure shown in FIG. 20.

Refer to FIG. 20, FIG. 21, and FIG. 22 together. FIG. 15 is a schematic diagram of still another SSPP transmission line structure according to an embodiment of this application. FIG. 21 is a bottom view of a first dielectric substrate in FIG. 20. FIG. 22 is a top view of the SSPP transmission line structure shown in FIG. 20. In this embodiment, a plurality of protrusion parts 31 are disposed on one side of the second metal strip 30, and the first metal strip 20 may include a first side 24 and a second side 25 at opposite positions. The first side 24 may be a same side as a protrusion side that is of the second metal strip 30 and on which protrusion parts 31 are disposed. In a width gradient segment of the first metal strip 20, the second side 25 of the first metal strip 20 gradually inclines toward the first side 24 of the first metal strip 20 until intersection with the first side 24, to implement a gradual decrease in a width. Similarly, the third metal strip may also include a first side and a second side at opposite positions. In a width gradient section of the third metal strip, the second side of the third metal strip gradually inclines toward the first side of the third metal strip until intersection with the first side, to implement a gradual decrease in a width. In a process in which the first metal strip 20 and the third metal strip gradually change and disappear, original signal energy distributed between the first metal strip 20 and the second metal strip 30 and between the second metal strip 30 and the third metal strip is gradually coupled to the second metal strip 30, so that the second metal strip 30 finally forms an SSPP transmission line having a single-layer metal structure.

During specific implementation, a width d0 of the second metal strip 30 may fall within a range of 0.15 mm to 0.25 mm. For example, d0 may be 0.15 mm, 0.2 mm, or 0.25 mm. An initial width w1 of the first metal strip 20 may fall within a range of 1.3 mm to 1.5 mm. For example, w1 may be 1.3 mm, 1.4 mm, or 1.5 mm. A length of the width gradient segment L3 of the first metal strip 20 may fall within a range of 12 mm to 14 mm. For example, the length of the width gradient segment L3 of the first metal strip 20 may be 12 mm, 13 mm, or 14 mm. A size setting of the third metal strip is similar to the size setting of the first metal strip 20, and details are not described herein.

It has been proved that the SSPP transmission line structure shown in FIG. 20 can achieve a similar working effect to the SSPP transmission line structure shown in FIG. 6.

It should be understood that, in this embodiment of this application, gradient forms of the first metal strip and the third metal strip are not limited to the manners described in the foregoing embodiments. For example, in some other embodiments, two sides of the first metal strip and two sides of the third metal strip may be of a non-linear shape or a non-arch shape, for example, a zigzag shape or a wave shape. In this case, the two sides of the first metal strip and the two sides of the third metal strip may gradually approach each other in a zigzag shape or a wave shape.

In conclusion, the SSPP transmission line structure provided in this embodiment of this application may couple signal energy in a vertical direction by using the first metal strip and the second metal strip that are spatially laminated, to finally concentrate the signal energy onto the second metal strip, so that the second metal strip forms an SSPP transmission line. Compared with a manner in which energy is coupled in a horizontal direction by using a coplanar waveguide in the conventional technology, in this solution, a width of the SSPP transmission line structure can be reduced, thereby achieving an effect of reducing occupied circuit space.

Figure 23:
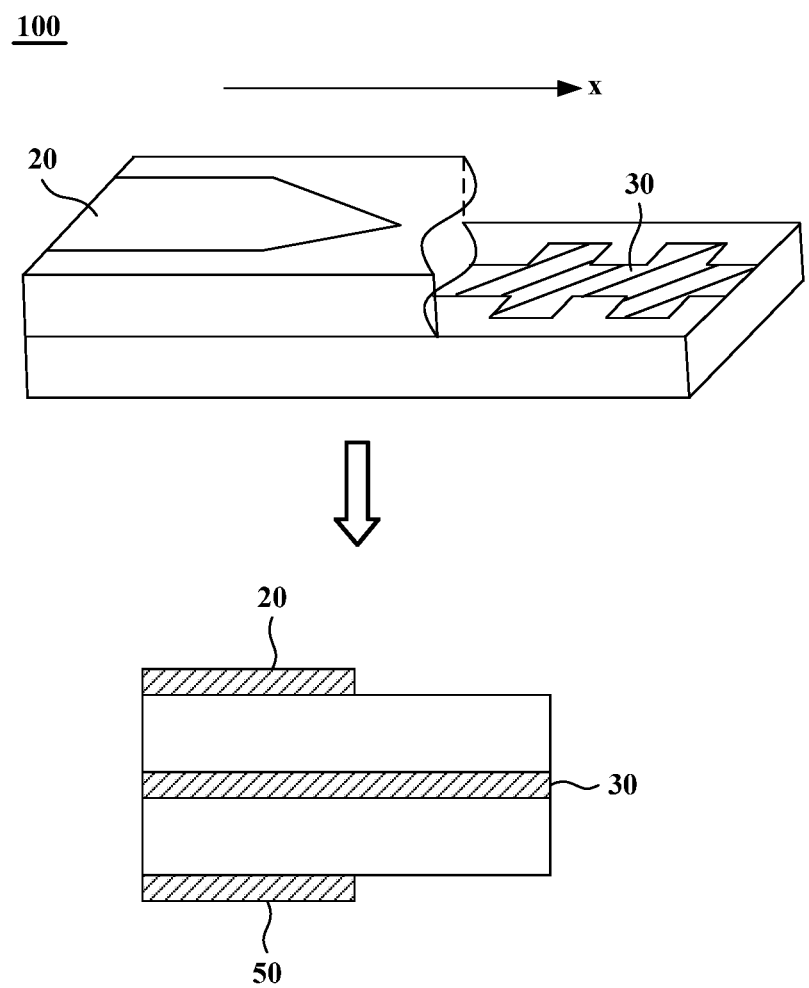
FIG. 23 is a schematic diagram of a structure of an electronic device according to an embodiment of this application.

An embodiment of this application further provides a circuit board. The circuit board may include the SSPP transmission line structure in any one of the foregoing possible embodiments. In an interconnection scenario of transmission lines inside a microwave circuit including a multi-layer board, the SSPP transmission line structure 100 may be used for conversion between the transmission lines inside the circuit board, to simplify a circuit structure. For example, as shown in FIG. 23, for a multi-layer board with a complex circuit structure and a relatively long transmission distance, the SSPP transmission line structure 100 may couple a stripline with a shield layer to the spoof surface plasmon polariton transmission line structure, to implement single-layer transmission, so that a structure of the circuit board is simpler. In addition, because an SSPP transmission line has a relatively large phase velocity, this conversion form can further shorten a length of a phase delay line, so that an overall circuit structure is more compact.

In addition, the circuit board may further include an interface. The interface may be a coaxial cable connector connected to a coaxial transmission line outside the circuit board. The SSPP transmission line structure may be coupled to the connector, to perform conversion between the coaxial transmission line and an SSPP transmission line on the circuit board. During specific implementation, a first metal strip of the transmission line structure may be coupled to an outer conductor of the coaxial transmission line by using the interface, and a second metal strip may be coupled to an inner conductor of the coaxial transmission line by using the interface, so that a signal of the coaxial transmission line can be transmitted to the SSPP transmission line structure. Then, signal energy is coupled to the second metal strip by using a conversion function of the SSPP transmission line structure, so that the second metal strip can finally form an SSPP transmission line having a single-layer metal structure on the circuit board.

Figure 24:
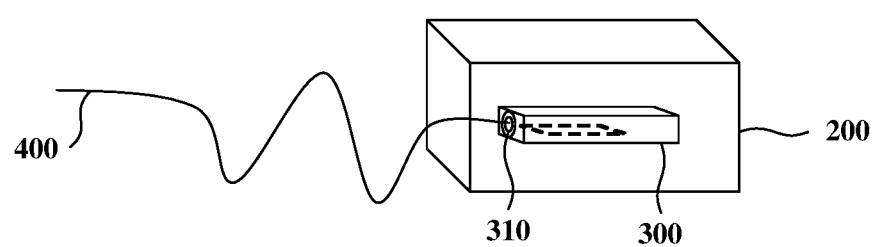
FIG. 24 is a schematic diagram of a conversion principle of an SSPP transmission line structure according to an embodiment of this application.

Referring to FIG. 24, an embodiment of this application further provides an electronic device 200. The electronic device 200 may include the circuit board 300 in the foregoing embodiment. Conversion between a coaxial transmission line 400 outside the electronic device 200 and an SSPP transmission line on the circuit board 300 may be performed by using an SSPP transmission line structure on the circuit board 300. For example, when the SSPP transmission line is used to transmit a microwave signal, the SSPP transmission line structure may be used to convert the outside coaxial transmission line into the SSPP transmission line on the circuit board 300 by using an interface 310, to input the microwave signal. The SSPP transmission line may continue to transmit the microwave signal to a rear end of the electronic device 200, for example, transmit the microwave signal to a signal processing module or an antenna of the electronic device 200. Alternatively, when the electronic device 200 outputs a microwave signal, the SSPP transmission line structure may be used to couple the SSPP transmission line on the circuit board 300 to the interface 310, to transmit the microwave signal to another electronic device by using the coaxial transmission line 400 connected to the interface.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A spoof surface plasmon polariton transmission line structure, comprising:
   a first dielectric substrate;
   a second dielectric substrate;
   a first metal strip;
   a second metal strip; and
   a third metal strip,
   wherein
   the first metal strip and the second metal strip are on two opposite surfaces of the first dielectric substrate,
   the first metal strip and the second metal strip separately extend in a first direction,
   a length of the first metal strip in the first direction is less than a length of the second metal strip in the first direction,
   in the first direction, a cross-sectional area of the first metal strip gradually decreases, at least one side of the second metal strip has a plurality of protrusion parts spaced apart,
   the second dielectric substrate is laminated on a same surface of the first dielectric substrate as the second metal strip,
   the third metal strip is on a surface of the second dielectric substrate and that faces away from the first dielectric substrate,
   the third metal strip extends in the first direction,
   a length of the third metal strip in the first direction is less than the length of the second metal strip in the first direction, and
   a cross-sectional area of the third metal strip gradually decreases in the first direction.

2. The spoof surface plasmon polariton transmission line structure according to claim 1, wherein
   the second metal strip comprises a first segment and a second segment in the first direction,
   areas of protrusion parts in the first segment gradually increase to a specified value,
   areas of protrusion parts in the second segment are equal and are all the specified value, and
   the second segment forms a spoof surface plasmon polariton transmission line having a single-layer metal structure.

3. The spoof surface plasmon polariton transmission line structure according to claim 1, wherein a plurality of the protrusion parts on a same side of the second metal strip are evenly spaced apart.

4. The spoof surface plasmon polariton transmission line structure according to claim 1, wherein protrusion parts are on two sides of the second metal strip.

5. The spoof surface plasmon polariton transmission line structure according to claim 4, wherein
   the first metal strip and the third metal strip have a first end and a second end in the first direction;
   the first metal strip has a first notch at the second end of the first metal strip, the first notch divides the first metal strip into a first branch and a second branch, and a width of the first branch and a width of the second branch gradually decrease in the first direction; and
   the third metal strip has a second notch at the second end of the third metal strip, the second notch divides the third metal strip into a third branch and a fourth branch, and a width of the third branch and a width of the fourth branch gradually decrease in the first direction.

6. The spoof surface plasmon polariton transmission line structure according to claim 4, wherein in the first direction, one or more of two side surfaces of the first metal strip gradually approach each other and intersect, or two side surfaces of the third metal strip gradually approach each other and intersect.

7. The spoof surface plasmon polariton transmission line structure according to claim 6, wherein one or more of:
   in the first direction, a width of the first metal strip decreases stepwise, a width of the first metal strip decreases linearly, or a side surface of the first metal strip comprises an arc surface; or
   in the first direction, a width of the third metal strip decreases stepwise, a width of the third metal strip decreases linearly, or a side surface of the third metal strip comprises an arc surface.

8. The spoof surface plasmon polariton transmission line structure according to claim 4, wherein positions of the plurality of protrusion parts on the two sides of the second metal strip are opposite, or positions of the plurality of protrusion parts on the two sides of the second metal strip are staggered.

9. The spoof surface plasmon polariton transmission line structure according to claim 1, wherein
   the first metal strip and the third metal strip comprise a first side and a second side, the first side is a same side as a protrusion side,
   the protrusion side is a side of the second metal strip having the protrusion parts;
   the second side of the first metal strip gradually inclines toward the first side of the first metal strip and intersects with the second side of the first metal strip, and
   the second side of the third metal strip gradually inclines toward the first side of the third metal strip and intersects with the second side of the third metal strip.

10. The spoof surface plasmon polariton transmission line structure according to claim 1, wherein a vertical projection of the first metal strip on the second dielectric substrate overlaps the third metal strip.

11. The spoof surface plasmon polariton transmission line structure according to claim 1, wherein the first metal strip is attached to a surface of the first dielectric substrate, or the first metal strip is embedded in the first dielectric substrate.

12. The spoof surface plasmon polariton transmission line structure according to claim 1, wherein the second metal strip is attached between the first dielectric substrate and the second dielectric substrate, or the second metal strip is embedded in one or more of the first dielectric substrate or the second dielectric substrate.

13. The spoof surface plasmon polariton transmission line structure according to claim 1, wherein the third metal strip is attached to a surface of the second dielectric substrate, or the third metal strip is embedded in the second dielectric substrate.

14. A circuit board, comprising:
a spoof surface plasmon polariton transmission line structure, comprising:
a first dielectric substrate;
a second dielectric substrate;
a first metal strip;
a second metal strip; and
a third metal strip,
wherein
the first metal strip and the second metal strip are on two opposite surfaces of the first dielectric substrate,
the first metal strip and the second metal strip separately extend in a first direction,
a length of the first metal strip in the first direction is less than a length of the second metal strip in the first direction,
in the first direction, a cross-sectional area of the first metal strip gradually decreases, at least one side of the second metal strip has a plurality of protrusion parts spaced apart,
the second dielectric substrate is laminated on a same surface of the first dielectric substrate as the second metal strip,
the third metal strip is on a surface of the second dielectric substrate and that faces away from the first dielectric substrate,
the third metal strip extends in the first direction,
a length of the third metal strip in the first direction is less than the length of the second metal strip in the first direction, and
a cross-sectional area of the third metal strip gradually decreases in the first direction.

15. The circuit board according to claim 14, wherein
the second metal strip comprises a first segment and a second segment in the first direction,
areas of protrusion parts in the first segment gradually increase to a specified value,
areas of protrusion parts in the second segment are equal and are all the specified value, and
the second segment forms a spoof surface plasmon polariton transmission line having a single-layer metal structure.

16. The circuit board according to claim 14, wherein a plurality of the protrusion parts on a same side of the second metal strip are evenly spaced apart.

17. The circuit board according to claim 14, wherein protrusion parts are on two sides of the second metal strip.

18. The circuit board according to claim 17, wherein
the first metal strip and the third metal strip have a first end and a second end in the first direction;
the first metal strip has a first notch at the second end of the first metal strip, the first notch divides the first metal strip into a first branch and a second branch, and a width of the first branch and a width of the second branch gradually decrease in the first direction; and
the third metal strip has a second notch at the second end of the third metal strip, the second notch divides the third metal strip into a third branch and a fourth branch, and a width of the third branch and a width of the fourth branch gradually decrease in the first direction.

19. The circuit board according to claim 17, wherein in the first direction, one or more of two side surfaces of the first metal strip gradually approach each other and intersect, or two side surfaces of the third metal strip gradually approach each other and intersect.

20. The circuit board according to claim 19, wherein one or more of:
in the first direction, a width of the first metal strip decreases stepwise, a width of the first metal strip decreases linearly, or a side surface of the first metal strip comprises an arc surface; or
in the first direction, a width of the third metal strip decreases stepwise, a width of the third metal strip decreases linearly, or a side surface of the third metal strip comprises an arc surface.

21. The circuit board according to claim 14, wherein
the first metal strip and the third metal strip comprise a first side and a second side, the first side is a same side as a protrusion side,
the protrusion side is a side of the second metal strip having the protrusion parts;
the second side of the first metal strip gradually inclines toward the first side of the first metal strip and intersects with the second side of the first metal strip, and
the second side of the third metal strip gradually inclines toward the first side of the third metal strip and intersects with the second side of the third metal strip.

22. The circuit board according to claim 14, wherein a vertical projection of the first metal strip on the second dielectric substrate overlaps the third metal strip.

23. The circuit board according to claim 14, wherein the first metal strip is attached to a surface of the first dielectric substrate, or the first metal strip is embedded in the first dielectric substrate.

24. The circuit board according to claim 14, wherein the second metal strip is attached between the first dielectric substrate and the second dielectric substrate, or the second metal strip is embedded in one or more of the first dielectric substrate or the second dielectric substrate.

25. The circuit board according to claim 14, wherein the third metal strip is attached to a surface of the second dielectric substrate, or the third metal strip is embedded in the second dielectric substrate.

26. The circuit board according to claim 14, wherein the circuit board further comprises an interface, and the interface is coupled to the spoof surface plasmon polariton transmission line structure.

27. The circuit board according to claim 26, wherein the interface is connected to a coaxial transmission line outside the circuit board.

28. The circuit board according to claim 27, wherein the first metal strip of the spoof surface plasmon polariton transmission line structure is coupled to an outer conductor of the coaxial transmission line by using the interface, and the second metal strip of the spoof surface plasmon polariton transmission line structure is coupled to an inner conductor of the coaxial transmission line by using the interface.

29. The circuit board according to claim 17, wherein positions of the plurality of protrusion parts on the two sides of the second metal strip are opposite, or positions of the plurality of protrusion parts on the two sides of the second metal strip are staggered.

\* \* \* \* \*